Oct. 3, 1961    J. L. SMALS ET AL    3,003,103
DEVICE FOR CONTINUOUSLY MEASURING THE CONCENTRATION OF
SOLIDS, SUSPENDED IN A FLUID, SAID SOLIDS HAVING
ELECTRIC PROPERTIES WHICH DIFFER FROM
THOSE OF THE FLUID
Filed Oct. 10, 1956

INVENTORS
Jacobus Laurens Smals
Johannes Jacobus Kamp
BY
Marshall, Marshall & Gaasting
Attorneys United States Patent Office 3,003,103
Patented Oct. 3, 1961

3,003,103
DEVICE FOR CONTINUOUSLY MEASURING THE CONCENTRATION OF SOLIDS, SUSPENDED IN A FLUID, SAID SOLIDS HAVING ELECTRIC PROPERTIES WHICH DIFFER FROM THOSE OF THE FLUID
Jacobus Laurens Smals and Johannes Jacobus Kamp, Amsterdam, Netherlands; said Smals assignor to N. V. Algemeen Technisch Ontwerpbureau Alto, Sliedrecht, Netherlands, a Dutch limited liability company
Filed Oct. 10, 1956, Ser. No. 615,142
Claims priority, application Netherlands Oct. 14, 1955
3 Claims. (Cl. 324—30)

The invention refers to a device for continuously measuring the concentration of substances, present in a fluid, said substances having electric properties which differ from those of the fluid e.g. of solid particles in liquids.

Lord Raleigh has calculated in which manner the electric properties of a fluid are influenced by substances present in the fluid, said matter having electric properties which differ from those of the fluid.

The invention provides means to directly measure the content of solid particles in a fluid.

The device according to the invention is mainly characterized therein that the bridge-circuit consists of a series-arrangement of two impedances, connected to a series-arrangement of two sources of potential in which between the interconnection of the impedances and that of the sources of potential a measuring device is provided.

The invention will now be more fully described with reference to the drawings.

In concentration measuring a bridge-circuit is used for comparing the impedances of the so-called measuring-cell in which the liquid, containing the solid substances is present with the impedance of the reference-cell, containing the same liquid, but freed from the solid particles. This is in principle indicated in FIG. 1. The bridge-circuit is fed with a potential E, which in principle is an alternating-current voltage for avoiding polarisation potentials on the electrodes of the cell.

The bridge-circuit comprises two equal impedances 1 and 2, the other branches respectively containing the measuring-cell Z1 and the reference-cell Z2. Between the diagonal-points of the bridge the measuring instrument, e.g. an amplifier 3 with measuring instrument 4 is provided, which instrument is able to indicate the concentration directly.

The invention will be discussed more specifically for the measuring of the concentration of solid insulating particles in a conducting liquid.

The conductivity of the solid particles in that case being zero, the Raleigh-function will no longer be influenced by variations of the conductivity of the liquid. Said function, however, is non-linear. By using special ratio's in the bridge the relation between the concentration of the solid matter and the diagonal potential of the bridge can be made substantially linear.

In practice it appeared that for a measuring range between 0 and 30 percent by volume of solid particles suspended in the fluid a bridge ratio of about 1:1 will give a sufficient correction. For higher percentages, e.g. of 60 percent of solids by volume a ratio of about 2:1 will give good results, i.e. the resistance of the measuring cell equals two times the resistance of the reference-cell.

Figures 1, 2:
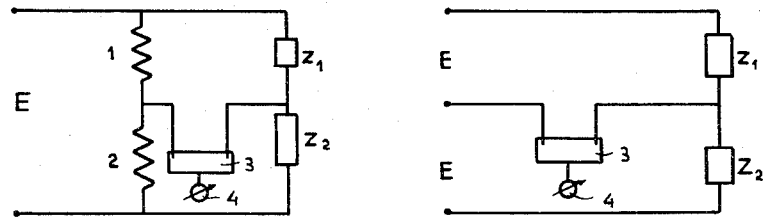
FIG. 1 shows a fundamental circuit, giving the percent variation independent of the absolute value of the properties of the fluid.
FIG. 2 shows a circuit according to the invention.

In FIG. 2 an improved circuit according to the invention is shown in principle. The sources of potential E are directly provided in two branches of the bridge, said sources may e.g. consist of the secondary windings of a power transformer, provided with one or more tapping points. By using special bridge-ratio's as indicated above the bridge-function can be made reasonably linear.

In measuring A.C. voltages zero-point-errors can be avoided if the transition-impedance between electrode and liquid is kept constant.

According to the invention this is attained by choosing the potential across the boundary-layer-impedance in such a way that said potential does not exceed 100 or 150 mv. In this case an ion-boundary-layer is obtained with a capacitive character.

When the potential exceeds the above mentioned values an ion-discharge can take place at the potential which is specific to the ion-type and the boundary layer at said higher potential obtains a pure resistance character. This results in a disturbance of the sine-wave shape of the A.C. potential. The surface condition of the electrodes also being defining for the ion-phenomena and being not the same for different electrodes, it will be very difficult to adjust the bridge to zero.

Figure 3:
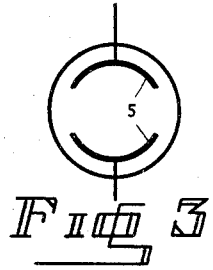
FIG. 3 is a diagrammatic embodiment of a measuring-cell especially for liquids.

For the determination of the impedance-variation according to Raleigh moreover the electrode-transition-impedance must be small with respect to the impedance to be measured. For obtaining a favourable ratio between said both impedances for tube-diameters of more than about 350 mm. use is made of diametrically opposed electrodes provided in the electrically insulated tube-wall as shown by 5 in FIG. 3; for tube diameters smaller than about 350 mm. annular electrodes are used, separated by tube sections with electrically insulating wall. The electrodes according to FIG. 3 embrace an angle of ±90°.

Figure 4:
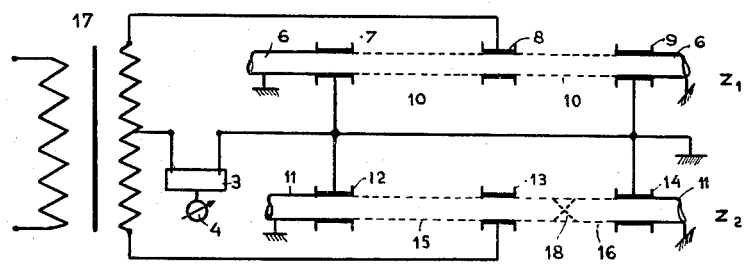
FIG. 4 shows an embodiment of the bridge-circuit according to the invention.

In FIG. 4 a circuit for smaller tube diameters is shown. The tube sections between the ring electrodes consist of insulating material, in FIG. 4 indicated by dotted lines. In this figure 6 is the tube for the liquid containing the solid particles, the concentration of which is to be determined. In the tube wall three annular electrodes 7, 8, 9 are provided. Said electrodes are mutually separated by tube sections 10 of insulating material (dotted lines). The reference-cell consists of a similar tube section 11 with three annular electrodes 12, 13, 14, mutually separated by insulating tube sections 15, 16. The outmost ring electrodes are connected with each other and the connecting point represents one of the diagonal points of the bridge. The A.C. potential is supplied by a transformer 17, the secondary windings of which having a central tapping point, forming the second diagonal point.

In the diagonal the amplifier 3 with the measuring instrument 4 is arranged. The free ends of the secondary windings of the transformer 17 are connected to the middle ring electrodes 8 and 13 of both cells.

The diagonal point of the bridge, connecting the outmost ring electrodes can be earthed like the tubes 6 and 11. In order to be able to adjust the influence of possible differences in the dimensions of the cells on the zero point and the influence of temperature-differences between the mixture and the reference liquid the electric resistance of one of the cells may be made adjustable.

In a preferred embodiment this is accomplished in the reference cell in which the liquid does not contain solid particles. The resistance can be varied by providing in the reference-cell in the arrangement according to FIG. 4 a rotatable valve, made of insulating material such as an adjustable valve 18 coated with or made of insulating material.

Figure 5:
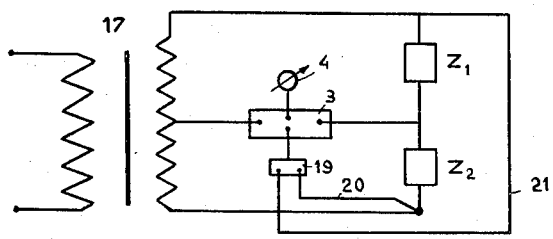
FIG. 5 shows a circuit for a compensated bridge-circuit.

In FIG. 5 a further embodiment of the invention is shown. It is desirable to make the amplifier 3 in such a way that the amplification can be adjusted inversely proportional to the voltage of the supply i.e. the potential across the cells. However, it is necessary to take the potential drop in the connections between transformer and bridge into account.

The element 19 controlling the amplification of the amplifier 3 in the desired way, which element can comprise a negative feedback device is fed by conductors 20, 21, connected to the terminals of the cells Z1, Z2, which are connected to the transformer 17 so that the control-element 19 is directly influenced by the potentials across the cells. It is necessary to make the resistances of the connections 20 and 21 equal.

I claim:

1. A circuit for measuring the concentration of insoluble insulating particles in a liquid, comprising a measuring cell having electrodes exposed to the particle bearing liquid, a reference cell having electrodes exposed to a reference liquid, said cells being connected in series across a source of voltage, said measuring cell with no particles having an impedance equal to twice the impedance of said reference cell, and means for measuring the voltage difference between the voltage across said measuring cell and a voltage equal to two thirds of the voltage of said source of voltage.

2. A circuit for measuring the concentration of insoluble insulating particles in a liquid comprising, a measuring cell having electrodes exposed to particle bearing liquid, a reference cell having electrodes exposed to particle-free liquid, said measuring cell having an impedance that increases with the concentration of the insulating particles from a zero concentration impedance that is twice the impedance of the reference cell, means connecting said cells in series across a source of voltage, and means for measuring the voltage difference between the voltage across said measuring cell and a voltage equal to two-thirds of the voltage across said cells.

3. A circuit for measuring the concentration of insoluble insulating particles in a liquid comprising, a measuring cell having electrodes exposed to the particle bearing liquid, a reference cell having electrodes exposed to a reference liquid, said measuring cell having an impedance that increases with the concentration of particles from a zero concentration impedance that is twice the impedance of the reference cell, means connecting said cells in series across a source of voltage to constitute two arms of a bridge circuit, other means froming other arms for the bridge circuit, and cross potential measuring means, said other means being proportional so said bridge is substantially balanced with a zero concentration of particles in said measuring cell.

References Cited in the file of this patent
UNITED STATES PATENTS

| | | |
|---|---|---|
| 2,330,394 | Stuart | Sept. 28, 1943 |
| 2,370,609 | Wilson et al. | Feb. 27, 1945 |
| 2,376,694 | Hewlett | May 22, 1945 |
| 2,492,174 | Noble et al. | Dec. 27, 1949 |
| 2,712,111 | Farison | June 28, 1955 |
| 2,769,139 | Obenshain | Oct. 30, 1956 |

OTHER REFERENCES

Electrical Measurements by Laws, first edition, 1917, pages 184 to 187.